(12) United States Patent
Ding et al.

(10) Patent No.: US 12,461,164 B2
(45) Date of Patent: Nov. 4, 2025

(54) METHOD, SYSTEM, DEVICE AND MEDIUM FOR DETECTING BATTERY STATE OF HEALTH

(71) Applicant: SHANGHAI MAKESENS ENERGY STORAGE TECHNOLOGY CO., LTD., Shanghai (CN)

(72) Inventors: Peng Ding, Shanghai (CN); Yanwen Zhang, Shanghai (CN); Weikun Wu, Shanghai (CN); Haowen Ren, Shanghai (CN); Zonglin Cai, Shanghai (CN); Guopeng Zhou, Shanghai (CN); Xiaohua Chen, Shanghai (CN); Xiao Yan, Shanghai (CN); Enhai Zhao, Shanghai (CN); Pei Song, Shanghai (CN); Danfei Gu, Shanghai (CN); Pingchao Hao, Shanghai (CN)

(73) Assignee: SHANGHAI MAKESENS ENERGY STORAGE TECHNOLOGY CO., LTD., Shanghai (CN)

( * ) Notice: Subject to any disclaimer, the term of this patent is extended or adjusted under 35 U.S.C. 154(b) by 165 days.

(21) Appl. No.: 18/237,493

(22) Filed: Aug. 24, 2023

(65) Prior Publication Data
US 2024/0069117 A1    Feb. 29, 2024

(30) Foreign Application Priority Data
Aug. 25, 2022    (CN) .......................... 202211024389.4

(51) Int. Cl.
G01R 31/392    (2019.01)
G01R 31/36     (2020.01)
H02J 7/00      (2006.01)

(52) U.S. Cl.
CPC ....... *G01R 31/392* (2019.01); *G01R 31/3646* (2019.01); *H02J 7/007* (2013.01)

(58) Field of Classification Search
None
See application file for complete search history.

(56) References Cited

U.S. PATENT DOCUMENTS

| | | | |
|---|---|---|---|
| 2013/0317771 A1* | 11/2013 | Laskowsky | H01M 10/482 702/63 |
| 2022/0244318 A1* | 8/2022 | Malmberg | G01R 31/3835 |

* cited by examiner

*Primary Examiner* — Jas A Sanghera
(74) *Attorney, Agent, or Firm* — troutman pepper locke; Tim Tingkang Xia, Esq.

(57) ABSTRACT

The invention discloses a method, a system, a device, and a medium for detecting a battery state of health. The method includes extracting a target curve segment from a first charging characteristic curve of a battery under test; and determining, according to a corresponding relation between characteristic parameters of the target curve segment and the battery state of health, the battery state of health matching the characteristic parameters of the target curve segment, and determining the battery state of health as the battery state of health of the battery under test. By utilizing said corresponding relation as the calculation basis, the invention improves the reliability and accuracy of the detection of battery state of health detection. The invention also tracks instances of abusive conditions that accelerate battery aging, assessing whether such conditions accelerate battery degradation and issuing warnings accordingly.

9 Claims, 6 Drawing Sheets

```
┌──────────────────────────────────────────────────┐     S1
│  Extracting a target curve segment from a first  │   ╱
│  charging characteristic curve of a battery      │
│  under test                                      │
└──────────────────────────────────────────────────┘
                         │
                         ▼
┌──────────────────────────────────────────────────┐     S2
│  Determining, according to a corresponding       │   ╱
│  relation between characteristic parameters of   │
│  the target curve segment and the battery state  │
│  of health, the battery state of health matching │
│  the characteristic parameters of the target     │
│  curve segment, and determining the battery      │
│  state of health as the battery state of health  │
│  of the battery under test                       │
└──────────────────────────────────────────────────┘
```

METHOD, SYSTEM, DEVICE AND MEDIUM FOR DETECTING BATTERY STATE OF HEALTH

CROSS-REFERENCE TO RELATED PATENT APPLICATION

This application claims priority to and the benefit of Chinese Patent Application No. 202211024389.4, filed Aug. 25, 2022, which is incorporated herein in its entirety by reference.

FIELD OF THE INVENTION

The invention relates generally to the field of battery technologies, and more particularly to a method, a system, a device, and a medium for detecting a battery state of health.

BACKGROUND OF THE INVENTION

With the advancement of power battery technology and quick charging technology, users are no longer concerned about the impact of range on driving, and an increasing number of users are choosing new energy vehicles. After prolonged use or repeated charging, the performance of the battery will exhibit noticeable decline. In recent years, many incidents of vehicle loss of control, spontaneous combustion, and even explosions caused by power battery failures have occurred.

When the overall rate of the heat generation exceeds the rate of heat dissipation, the battery temperature increases with the accumulation of heat. Elevated temperatures enhance the chemical activity of materials within the battery, accelerating chemical reaction rates or introducing new side reactions, which continue to release more heat, creating a vicious cycle. Sustained temperature increase leads to the melting or decomposition of internal battery materials, and in severe cases, it can trigger serious incidents such as internal short circuits, thermal runaway, and the like.

However, currently there is no reliable method for assessing the state of health of batteries, which results in the inability to promptly avoid continued use of a power battery in the event of a malfunction, thus leading to safety incidents.

Therefore, a heretofore unaddressed need exists in the art to address the aforementioned deficiencies and inadequacies.

SUMMARY OF THE INVENTION

The technical problem to be solved by the present invention is to overcome the shortcomings of poor reliability and low accuracy of battery state of health detection in the prior art by providing a method, a system, a device, and a medium for detecting a battery state of health.

The invention solves the above technical problems through the following technical scheme:

In a first aspect, a method for detecting a battery state of health is provided, comprising:
  extracting a target curve segment from a first charging characteristic curve of a battery under test; the first charging characteristic curve being determined according to first charging data obtained by charging the battery under test according to target charging parameters, and the target curve segment being at least one curve segment with highest correlation to the battery state of health;
  determining, according to a corresponding relation between characteristic parameters of the target curve segment and the battery state of health, the battery state of health matching the characteristic parameters of the target curve segment, and determining the battery state of health as the battery state of health of the battery under test; wherein the corresponding relation is determined according to second charging data obtained by charging a test battery of the same type as the battery under test using the target charging parameters.

Optionally, the characteristic parameters include a charging duration, and the extracting a target curve segment from a first charging characteristic curve of the battery to be tested comprises:
  dividing the first charging characteristic curve into a plurality of first curve segments;
  calculating a correlation coefficient of the charging duration and the battery state of health of each first curve segment;
  and selecting at least one of the first curve segments with a highest correlation coefficient as a target curve segment of the first charging characteristic curve.

Optionally, establishing the corresponding relation comprises the following steps:
  charging the test battery for M times to obtain the second charging data corresponding to each time; the second charging data including a second charging characteristic curve and a battery state of health; M≥1 and M being an integer;
  for each second charging characteristic curve, dividing the second charging characteristic curve into a plurality of second curve segments according to a same division rule, calculating a correlation coefficient between the charging duration and the battery state of health of each second curve segment, and selecting at least one second curve segment with a highest correlation coefficient as a target curve segment of the second charging characteristic curve;
  and fitting the target curve segments corresponding to the M second charging characteristic curves and the M battery states of health, and determining the fitting result as the corresponding relation.

In a second aspect, the present invention provides a system for detecting a battery state of health, comprising:
  an extraction module, configured to extract a target curve segment from a first charging characteristic curve of a battery under test; the first charging characteristic curve being determined according to first charging data obtained by charging the battery under test according to target charging parameters, and the target curve segment being at least one curve segment with highest correlation to the battery state of health;
  a first determination module, configured to determine, according to a corresponding relation between characteristic parameters of the target curve segment and the battery state of health, the battery state of health matching the characteristic parameters of the target curve segment, and determining the battery state of health as the battery state of health of the battery under test; and determining the corresponding relation according to second charging data obtained by charging a test battery of the same type as the battery under test using the target charging parameters.

Optionally, the characteristic parameters include a charging duration, and the extraction module comprises:
- a first dividing unit, configured to divide the first charging characteristic curve into a plurality of first curve segments;
- a calculation unit, configured to calculate a correlation coefficient of the charging duration and the battery state of health of each first curve segment;
- a selection unit, configured to select at least one of the first curve segments with a highest correlation coefficient as the target curve segment of the first charging characteristic curve.

Optionally, the corresponding relationship comprises the following units:
- an acquisition unit, configured to charge the test battery for M times to obtain the second charging data corresponding to each time; the second charging data including a second charging characteristic curve and a battery state of health; M≥1 and M being an integer;
- a second dividing unit, configured to divide each second charging characteristic curve into a plurality of second curve segments according to a same division rule, calculate a correlation coefficient between the charging duration and the battery state of health of each second curve segment, and select at least one second curve segment with a highest correlation coefficient as a target curve segment of the second charging characteristic curve;
- and a fitting unit, configured to fit the target curve segments corresponding to the M second charging characteristic curves and the M battery states of health and determine the fitting result as the corresponding relation.

Optionally, the system further comprises:
- an assessment module, configured to assess whether a number of charging times of the battery under test in abusive operating conditions meets a frequency threshold; if the assessment result is yes, invoking the extraction module, and if the assessment result is no, invoking a second determination module.

The system further comprises:
- the second determination module, configured to determine a capacity and a direct current internal resistance of the battery under test during a current charging time and at least one past charging time;
- a calculation module, configured to calculate a relative change rate of current internal resistance capacity of the battery under test according to the capacity and the direct current internal resistance;
- and a detection module, configured to detect abusive operating conditions of the battery under test according to the relative change rate of current internal resistance capacity and the corresponding relation between relative change rates of internal resistance capacity and abnormal types.

In a third aspect, the present invention provides an electronic device comprising a processor, a memory, and a computer program stored on the memory and executable on the processor, wherein the processor implements the method for detecting a battery state of health according to the first aspect when executing the computer program.

In a fourth aspect, the present invention provides a computer-readable storage medium on which a computer program is stored, which, when executed by a processor, implements the method for detecting a battery state of health according to the first aspect.

The positive advancement achieved by the present invention is that by establishing a corresponding relation between the characteristic parameters of the target curve segment of the battery under test and the battery state of health, the battery state of health matching the characteristic parameters of the target curve segment is determined as the battery state of health of the battery under test. This enhances the reliability and accuracy of battery state of health detection. Additionally, abusive operating conditions that accelerate battery aging are quantified, and the potential acceleration of battery degradation due to such abusive conditions is assessed, allowing for early warnings to be issued.

BRIEF DESCRIPTION OF THE DRAWINGS

The accompanying drawings illustrate one or more embodiments of the invention and, together with the written description, serve to explain the principles of the invention. The same reference numbers may be used throughout the drawings to refer to the same or like elements in the embodiments.

DETAILED DESCRIPTION OF THE INVENTION

Figure 1:
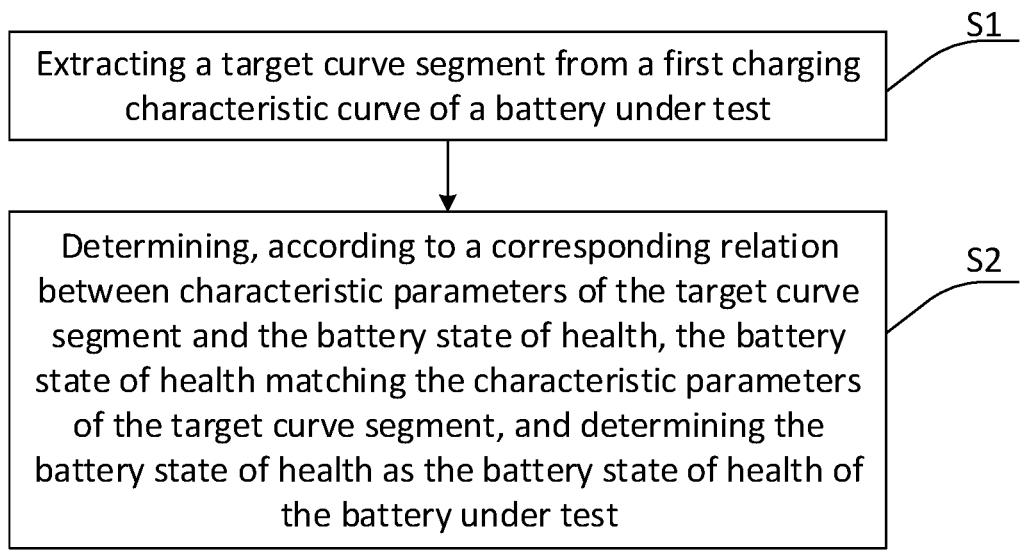
FIG. 1 is a flowchart of a method for detecting a battery state of health according to Embodiment 1 of the present invention.

Embodiments of the invention are described below through specific examples in conjunction with the accompanying drawings in FIGS. 1-7, and those skilled in the art can easily understand other advantages and effects of the invention from the content disclosed in this specification. The invention can also be implemented or applied through other different specific implementations, and various modifications or changes can be made to the details in this specification according to different viewpoints and applications without departing from the spirit of the invention. It should be noted that, in the case of no conflict, the following embodiments and features in the embodiments can be combined with each other.

It should be noted that the drawings provided in the following embodiments are merely illustrative in nature and serve to explain the principles of the invention, and are in no way intended to limit the invention, its application, or uses. Only the components related to the invention are shown in the drawings rather than the number, shape and size of the components in actual implementations. For components with the same structure or function in some figures, only one of them is schematically shown, or only one of them is marked. They do not represent the actual structure of the product. Dimensional drawing, the type, quantity and proportion of each component can be changed arbitrarily in its actual implementations. More complicated component layouts may also become apparent in view of the drawings, the specification, and the following claims.

The terminology used herein is for the purpose of describing particular embodiments only and is not intended to be limiting of the invention. As used herein, "a" not only means "only one," but also means "more than one." The term "and/or" used in the description of the present application and the appended claims refers to any combination and all possible combinations of one or more of the associated listed items, and includes these combinations. The terms "first," "second," etc. are only used for distinguishing descriptions, and should not be construed as indicating or implying relative importance.

It should be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

In order to more clearly illustrate the embodiments of the invention or the technical solutions in the prior art, the following description will explain the specific embodiments of the invention with reference to the accompanying drawings. It is evident that the drawings in the following description are only examples of the invention, from which other drawings and other embodiments can be obtained by a person skilled in the art without inventive effort.

The invention is further illustrated by the following examples, which are not intended to limit the scope of the invention.

Embodiment 1

The present embodiment provides a method for detecting a battery state of health of a battery, as shown in FIG. 1, the method including the following steps:

S1, extracting a target curve segment from a first charging characteristic curve of a battery under test.

The first charging characteristic curve is determined according to first charging data obtained by charging the battery under test according to target charging parameters, and the target curve segment is at least one curve segment with the highest correlation to the battery state of health, namely, the curve segment that best characterizes the aging state of the battery.

The target charging parameters include at least one of the following parameters: temperature, charging current/charging voltage, maximum individual cell voltage, maximum allowable charging current, and standard charging current, among others.

The charging characteristic curve portrays the relationship between battery voltage and charging time under constant current charging conditions, or the relationship between charging current and charging time under constant voltage charging conditions. Taking constant current charging as an example, the following describes a process of detecting a battery state of health.

S2, determining, according to a corresponding relation between characteristic parameters of the target curve segment and the battery state of health, the battery state of health matching the characteristic parameters of the target curve segment, and determining the battery state of health as the battery state of health of the battery under test.

The corresponding relation is determined according to second charging data obtained by charging a test battery of the same type as the battery under test using the target charging parameters.

For example, assume that the following corresponding relations are obtained: characteristic parameter a-battery state of health a', characteristic parameter b-battery state of health b', characteristic parameter c-battery state of health c', characteristic parameter d-battery state of health d'. If the characteristic parameter of the target curve segment of the battery under test is b, according to the corresponding relation, the battery state of health of the battery under test is determined to be b'.

In one embodiment, a first charging characteristic curve is obtained by charging the battery under test using an off-board conductive charger of an electric vehicle, and steps S1 and S2 are then executed to determine the battery state of health of the battery under test.

In one embodiment, a BMS (Building Management System) obtains a first charging characteristic curve through communication protocols between the BMS and the off-board conductive charger of an electric vehicle, and steps S1 and S2 are then executed to determine the battery state of health of the battery under test.

In one embodiment, the target curve segment of the battery under test is determined based on past experience. For batteries under test that are of the same type, they have the same target curve segments. That is, the upper voltage limit of the target curve segments is the same for all batteries under test of the same type, and the lower voltage limit of the target curve segments is also the same for all batteries under test of the same type.

In one embodiment, the target curve segment is determined based on the first charging data of the current charging session of the battery under test, that is, the target curve segment is determined according to the characteristics and the real-time charging state of the battery under test. When the target curve segment is extracted, a first charging characteristic curve obtained according to first charging data is divided into a plurality of first curve segments, the magnitude of a correlation coefficient P between a characteristic parameter corresponding to each first curve segment and an SOH (State of Health) value is calculated, and the target curve segment is selected from the plurality of first curve segments according to the magnitude of the correlation coefficient P. The correlation coefficient P may be characterized by, but is not limited to, a Pearson correlation coefficient.

In one embodiment, the characteristic parameters include at least one of a charging duration, a gradient, a slope, and the like. If the characteristic parameters are represented by the charging duration, when calculating the correlation coefficient P, the magnitude of the correlation coefficient P is calculated for each first curve segment by considering the correlation between its charging duration and the SOH value.

In the case where the first charging characteristic curve represents a curve of the battery voltage versus the charging duration, the first curve segment also represents a relationship of the battery voltage versus the charging duration, and the charging duration of the first curve segment is the charging duration required for the lower voltage limit value of the curve segment to rise to the upper voltage limit value.

Figure 2:
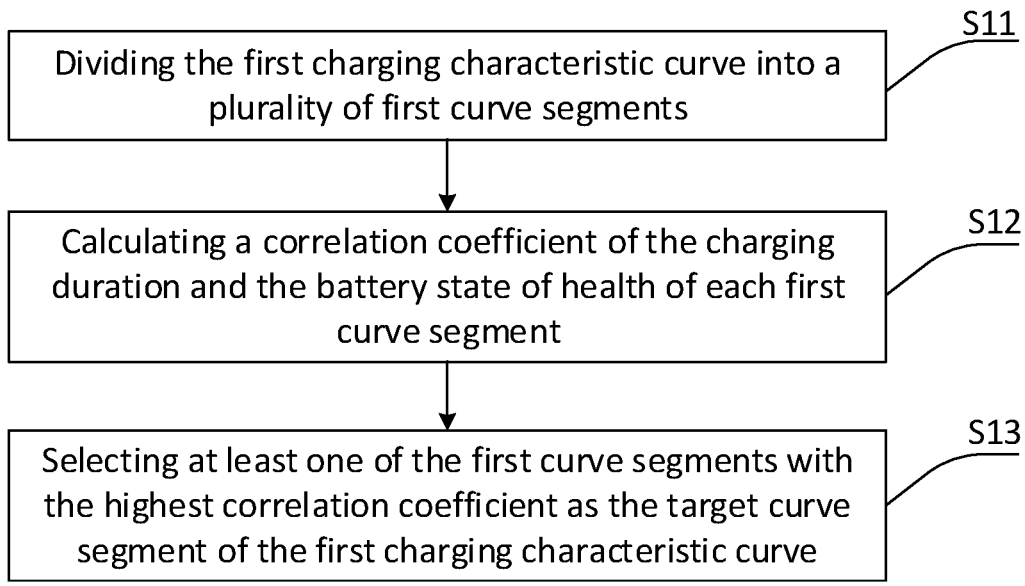
FIG. 2 is a flowchart of step S1 of a method for detecting a battery state of health according to Embodiment 1 of the present invention.

The following further explains the process of determining the target curve segment using charging duration as a characteristic parameter, as shown in FIG. 2, the characteristic parameters including the charging duration, and the step S1 including:

S11, dividing the first charging characteristic curve into a plurality of first curve segments.

The division rule for the first charging characteristic curve may be set according to actual conditions, but needs to be the same as the division rule for the second charging characteristic curve described below.

S12, calculating a correlation coefficient of the charging duration and the battery state of health of each first curve segment.

S13, selecting at least one first curve segment with the highest correlation coefficient as the target curve segment of the first charging characteristic curve.

The list of correlation coefficients corresponding to N curve segments may be: $[P_1, P_2, P_3, P_4 \ldots P_N]$. At least one curve segment of the N curve segments, in which the correlation coefficient is the highest value, may be taken as a target curve segment. Alternatively, a plurality of first curve segments with correlation coefficients closest to 1 may be selected as candidate curve segments, and from all the candidate curve segments, one or more curve segments with the highest correlation coefficient may be selected as target curve segments of the first charging characteristic curve.

In an embodiment, at step S2, when the characteristic parameters include a charging duration, a charging duration corresponding to a maximum charging voltage of a single battery in the battery under test in the target curve segment is obtained from the second charging data, a battery state of health matching the charging duration is calculated by combining a corresponding relation between characteristic parameters of the target curve segment and a battery state of health, and the calculated battery state of health is represents the battery state of health of the battery under test in current charging conditions.

Figure 3:
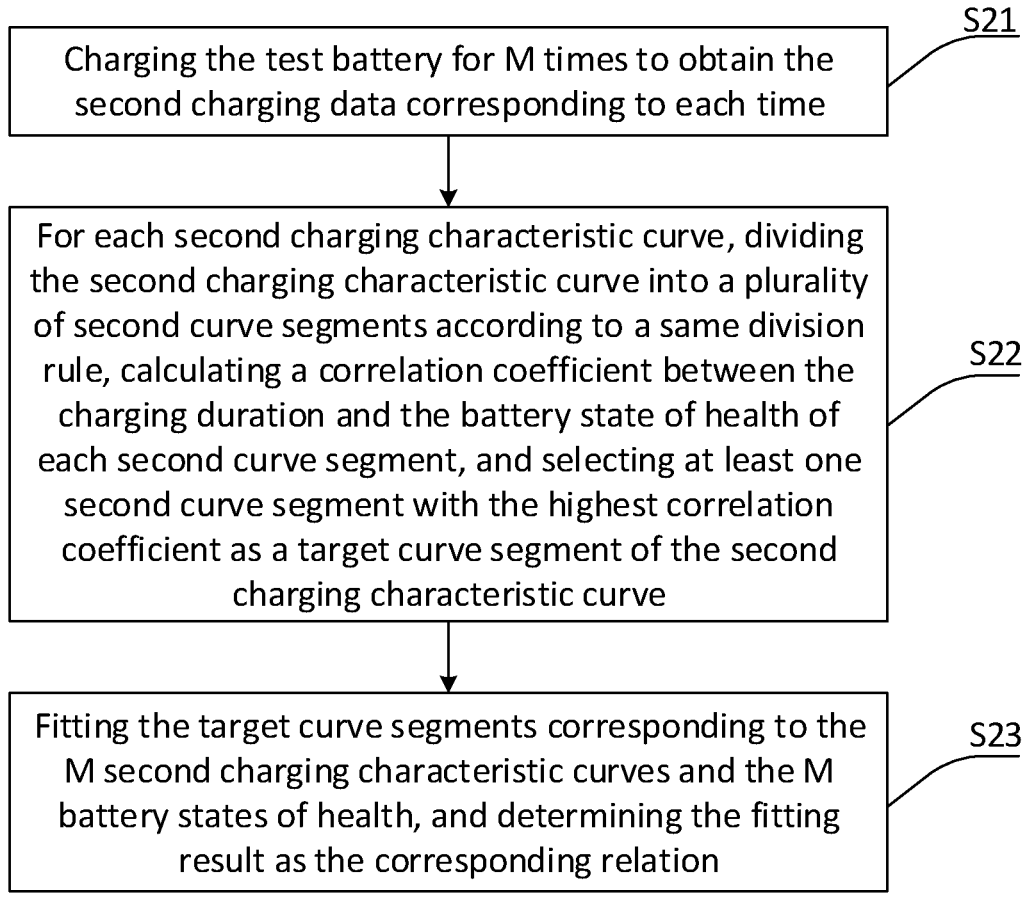
FIG. 3 is a flowchart illustrating establishment of a corresponding relationship in step S2 of a method for detecting a battery state of health according to Embodiment 1 of the present invention.

A specific implementation of determining the corresponding relation is described below, and as shown in FIG. 3, the corresponding relation in step S2 is established through the following steps:

S21, charging the test battery for M times to obtain the second charging data corresponding to each time; the second charging data including a second charging characteristic curve and a battery state of health; M≥1 and M being an integer.

It should be noted that the test battery may be a plurality of batteries of the same type.

S22, for each second charging characteristic curve, dividing the second charging characteristic curve into a plurality of second curve segments according to a same division rule, calculating a correlation coefficient between the charging duration and the battery state of health of each second curve segment, and selecting at least one second curve segment with the highest correlation coefficient as a target curve segment of the second charging characteristic curve.

S23, fitting the target curve segments corresponding to the M second charging characteristic curves and the M battery states of health, and determining the fitting result as the corresponding relation.

During the process of charging the test battery for M times, obtaining M second charging characteristic curves, each time of charging corresponds to one SOH value, resulting in M SOH values. Considering an example in which the test batteries all decayed from 100% SOH value to 75% SOH value, the SOH value can be calculated using the formula:

$$SOH = C\_now/C\_rated$$

wherein C_now represents the actual charging capacity of the test battery currently charged, and is obtained by the BMS; C_rated represents the factory rated capacity of the test battery.

The second charging characteristic curve is divided into a plurality of second curve segments, from which the target curve segment is selected. Specifically, the correlation coefficient P corresponding to each second curve segment is calculated. The specific calculation formula of P is as follows:

$$P = \frac{\sum_i (\Delta T_i - \overline{\Delta T})(S_i - \overline{S})}{\sqrt{\sum_i (\Delta T_i - \overline{\Delta T})^2} \sqrt{\sum_i (S_i - \overline{S})^2}}$$

wherein 1≤i≤M, $\Delta T_i$ is the charging duration of the ith charging time corresponding to each second curve segment, $\overline{\Delta T}$ is the average charging duration of M charging times corresponding to each second curve segment, $S_i$ is the SOH value for the ith charging time corresponding to each second curve segment, and $\overline{S}$ is the average SOH value of M charging times corresponding to each second curve segment. The second curve segment that corresponds to the highest correlation coefficient P is selected as the target curve segment for the second charging characteristic curve.

Each second curve segment corresponds to M SOH values. A correlation coefficient P corresponding to each second curve segment can be calculated using M charging durations and M SOH values.

Higher-order or exponential equations can be used to fit M target curve segments and M battery states of health, wherein a specific calculation formula is as follows:

$$SOH_i = \alpha \Delta T_i^2 + \beta \Delta T_i + \gamma$$

wherein $\Delta T_i$ is the charging duration of the ith charging time corresponding to the target curve segment, $SOH_i$ is the SOH value for the ith charging time corresponding to the target curve segment, and α、β、γ are fitting parameters.

In this embodiment, by establishing a corresponding relation between the characteristic parameters of the target curve segment of the tested battery and the battery state of health, using characteristic parameters of the target curve segment matching battery states of health to determine the battery state of health of the battery under test, the reliability and accuracy of battery state of health detection are improved.

Embodiment 2

Figure 4:
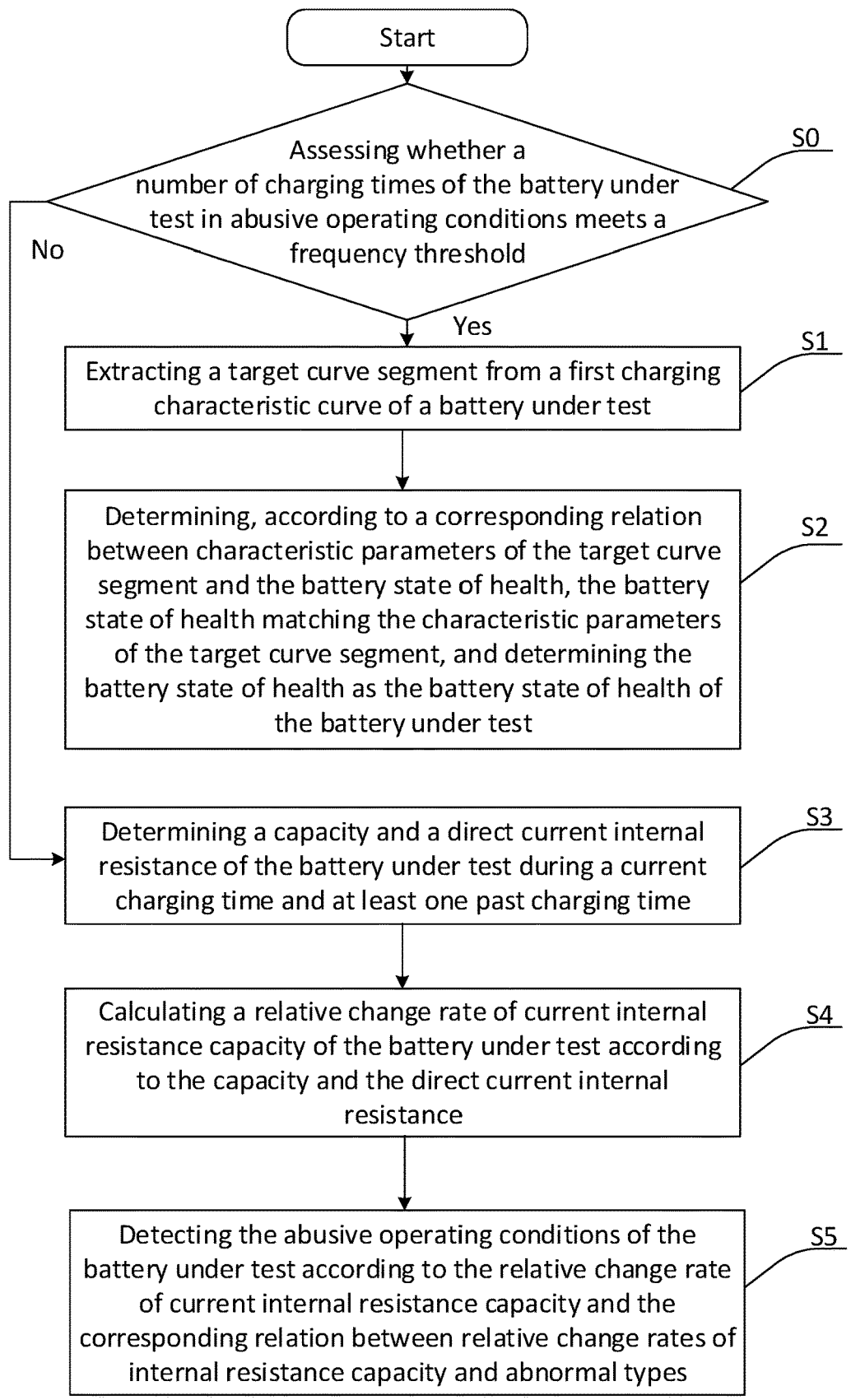
FIG. 4 is a flowchart of a method for detecting a battery state of health according to Embodiment 2 of the present invention.

On the basis of Embodiment 1, the present embodiment provides an improved method for detecting a battery state of health, as shown in FIG. 4. In comparison with Embodiment 1, before step S1, the method further includes the steps of:

S0, assessing whether a number of charging times of the battery under test in abusive operating conditions meets a frequency threshold;

If the assessment result of step S0 is yes, executing step S1; and if the assessment result of step S0 is no, executing step S3.

The charging data may include, but is not limited to, ambient temperature, charging rate, charging voltage, charging current, and the like. The BMS can be used to detect the ambient temperature in which the battery under test is charged, such as high temperature or low temperature; parameters that characterize life cycle features of the battery under test, such as charging rate, and parameters that characterize the state of charge of the battery under test, such as the charging voltage and the charging current, can also be used. Based on charging data obtained from the BMS, it can be determined whether the battery under test is experiencing any one of the abusive operating conditions of high temperature, low temperature, high charging rate, overcharging or over-discharging during each charging time, and step S1 is automatically executed when it is detected that the number of charging times in the abusive operating conditions meet a frequency threshold. The frequency threshold is determined according to actual requirements, and is set to 4 times, for example. If the number of charging times under abusive operating conditions is detected not to exceed the frequency threshold, step S3 is automatically executed.

After step S2, the detection method further includes the steps of: S3, determining a capacity and a direct current internal resistance of the battery under test during a current charging time and at least one past charging time.

If past data from multiple charging cycles are used to calculate the relative change rate of internal resistance capacity, the calculation can involve the average values of the capacity and direct current internal resistance for each past charging time of the battery under test. Alternatively, a weighted calculation based on the weighted average of the capacity and DC internal resistance values for each past charging cycle can be performed.

If the capacity and the direct current internal resistance of the battery under test during multiple past charging times are adopted to calculate the relative change rate of internal resistance capacity, the relative change rate of internal resistance capacity is calculated according to the capacity average value and the direct current internal resistance average value of the battery under test during each past charging time. Alternatively, the relative change rate of internal resistance capacity is calculated according to the weighted result of the capacity and the weighted result of the direct current internal resistance of the battery under test during each past charging time.

S4, calculating a relative change rate of current internal resistance capacity of the battery under test according to the capacity and the direct current internal resistance.

Experiments show that the relative change rate of internal resistance capacity can effectively diagnose abnormal battery aging and provide early warnings for battery misuse.

S5, detecting the abusive operating conditions of the battery under test according to the relative change rate of current internal resistance capacity and the corresponding relation between relative change rates of internal resistance capacity and abnormal types.

If the current charging capacity of the battery under test is Cn_charge, the SOC (State of Charge) value of the battery under test before charging is $SOC_1$, the SOC value of the battery under test after charging is $SOC_2$, and the capacity Cn can be calculated based on $SOC_1$ and $SOC_2$ using the following formula:

$$Cn=(Cn\_charge)/(SOC_2-SOC_1)$$

When the battery under test reached 90% SOC, it was left to rest for 5 minutes, and after charging the battery under test for 10 seconds applying a pulse current of 75% $I_{max}$, it was left to rest for 5 minutes. The corresponding pulse voltage rise $\Delta U$ on the battery under test was measured. The direct current internal resistance $R_n$ can be calculated based on the pulse voltage rise $\Delta U$ using the following formula:

$$R_n = \frac{\Delta U}{0.75 * I_{max}}$$

At step S3, a first capacity Cn1 of the battery under test during current charging and a second capacity Cn2 of the battery under test during any at least one past charging are obtained, and a first difference |Cn1−Cn2| between the first capacity and the second capacity can be calculated according to a weighted result or an average result of capacities of the battery to be measured during multiple past charging. The method comprises the steps of obtaining a first direct current internal resistance Rn1 during current charging and a second direct current internal resistance Rn2 during any at least one past charging, determining the first direct current internal resistance Rn2 according to a weighted result or an average result of the direct current internal resistances of the batteries under test which are subjected to multiple past charging, and calculating a second difference value |Rn1−Rn2| between the first direct current internal resistance and the second direct current internal resistance.

At step S4, the relative change rate of current internal resistance capacity $K_{mn}$ is calculated based on the first difference value and the second difference value. The specific calculation formula for $K_{mn}$ is as follows:

$$K_{mn} = \frac{|Rn1 - Rn2|}{|Cn1 - Cn2|}$$

At step S5, multiple sets of comparison tests may be performed on the batteries under test of the same type and the same rated capacity in advance, including single variable tests such as a normal aging condition test, an overcharge aging condition test, a high-temperature aging condition test, a low-temperature aging condition test, and the like. During the tests, charging can be performed under a constant-current condition, and discharging can be carried out under any accelerated aging condition. The objective is to determine a normal range and an abnormal range of relative change rates of internal resistance capacity under tests of different aging conditions, so as to provide a basis for subsequent abusive condition detection on the batteries under test.

Once the abnormal type of the battery under test is determined, the relative change rate of current internal resistance capacity is assessed to determine whether it falls within the abnormal range. If yes, this indicates the current charging of the battery under test is under abusive operating conditions, resulting in permanent damage to the battery and automatically triggering an alarm prompt.

In present embodiment, the number of times the battery under test is charged under abusive operating conditions is compared with the frequency threshold, and if the condition is met, the battery state of health that matches the characteristic parameters of the target curve segment is determined to be the battery state of health of the battery under test; if not met, the relative change rate of current internal resistance capacity of the battery under test is calculated using capacity and direct current internal resistance, enabling detection of abusive operating conditions for the battery under test. This invention improves the reliability and accuracy of battery state of health detection by combining normal decay SOH value calculations with abnormal decay warnings.

Embodiment 3

Figure 5:
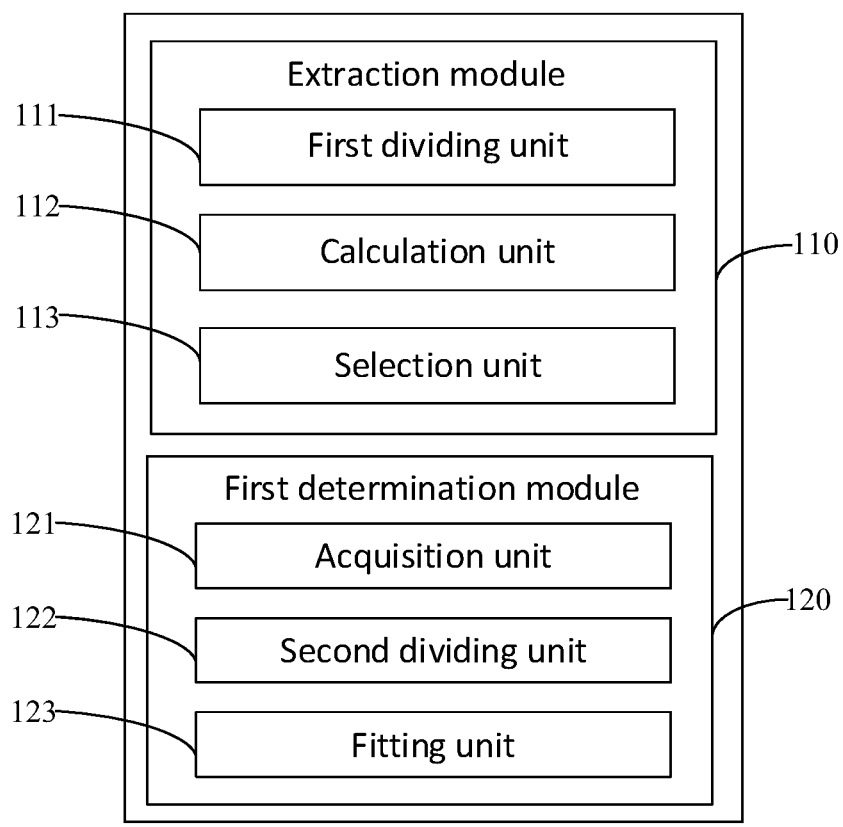
FIG. 5 is a block diagram of a system for detecting a battery state of health according to Embodiment 3 of the present invention.

The present embodiment provides a system for detecting a battery state of health, as shown in FIG. 5, the detection system including: an extraction module 110 and a first determination module 120.

The extraction module 110 is configured to extract a target curve segment from a first charging characteristic curve of a battery under test.

The first charging characteristic curve is determined according to first charging data obtained by charging the battery under test according to the target charging parameters, and the target curve segment is at least one curve segment with the highest correlation to the battery state of health, namely, the curve segment which can best represent the aging state of the battery.

The target charging parameters include at least one of the following parameters: temperature, charging current/charging voltage, maximum individual cell voltage, maximum allowable charging current, and standard charging current, among others.

The charging characteristic curve represents a curve of the voltage of the battery to the charging time when the battery is charged with a constant current of a current value; or the charging current versus charging time when charging at a constant voltage. The following describes a process of detecting the state of health of the battery using constant current charging as an example.

The first determination module 120 is configured to determine, according to a corresponding relation between characteristic parameters of the target curve segment and the battery state of health, the battery state of health matching the characteristic parameters of the target curve segment, and determine the battery state of health as the battery state of health of the battery under test.

The corresponding relation is determined according to second charging data obtained by charging the test battery of the same type as the battery under test using the target charging parameters.

For example, assume that the following corresponding relations are obtained: the characteristic parameter a-battery state of health a', the characteristic parameter b-battery state of health b', the characteristic parameter c-battery state of health c', the characteristic parameter d-battery state of health d'. If the characteristic parameter of the target curve segment of the battery under test is b, the battery state of health of the battery under test is determined to be b' according to the corresponding relation.

In one embodiment, a first charging characteristic curve is obtained by charging the battery under test using an off-board conductive charger of an electric vehicle, and the extraction module 110 and the first determination module 120 are invoked to determine the battery state of health of the battery under test.

In one embodiment, a BMS (Building Management System) obtains a first charging characteristic curve through communication protocols between the BMS and the off-board conductive charger of an electric vehicle, and the extraction module 110 and the first determination module 120 are invoked to determine the battery state of health of the battery under test.

In one embodiment, the target curve segment of the battery under test is determined based on past experience. For batteries under test that are of the same type, they have the same target curve segments. That is, the upper voltage limit of the target curve segments is the same for all batteries under test of the same type, and the lower voltage limit of the target curve segments is also the same for all batteries under test of the same type.

In one embodiment, the target curve segment is determined based on the first charging data of the current charging session of the battery under test, that is, the target curve segment is determined according to the characteristics and the real-time charging state of the battery under test. When the target curve segment is extracted, a first charging characteristic curve obtained according to first charging data is divided into a plurality of first curve segments, the magnitude of a correlation coefficient P between a characteristic parameter corresponding to each first curve segment and an SOH (State of Health) value is calculated, and the target curve segment is selected from the plurality of first curve segments according to the magnitude of the correlation coefficient P. The correlation coefficient P may be characterized by, but is not limited to, a Pearson correlation coefficient.

In one embodiment, the characteristic parameters include at least one of a charging duration, a gradient, a slope, and the like. If the characteristic parameters are represented by the charging duration, when calculating the correlation coefficient P, the magnitude of the correlation coefficient P is calculated for each first curve segment by considering the correlation between its charging duration and the SOH value.

In the case where the first charging characteristic curve represents a curve of the battery voltage versus the charging duration, the first curve segment also represents a relationship of the battery voltage versus the charging duration, and the charging duration of the first curve segment is the charging duration required for the lower voltage limit value of the curve segment to rise to the upper voltage limit value.

The following further explains the process of determining the target curve segment using charging duration as a characteristic parameter, as shown in FIG. 5, the characteristic parameters including the charging duration, and the extraction module 110 including:

A first dividing unit 111, configured to divide the first charging characteristic curve into a plurality of first curve segments.

The division rule for the first charging characteristic curve may be set according to actual conditions, but needs to be the same as the division rule for the second charging characteristic curve described below.

A calculation unit 112, configured to calculate a correlation coefficient of the charging duration and the battery state of health of each first curve segment.

A selection unit 113, configured to select at least one first curve segment with the highest correlation coefficient as the target curve segment of the first charging characteristic curve.

The list of correlation coefficients corresponding to N curve segments may be: $[P_1, P_2, P_3, P_4 \ldots P_N]$. At least one curve segment of the N curve segments, in which the correlation coefficient is the highest value, may be taken as a target curve segment. Alternatively, a plurality of first curve segments with correlation coefficients closest to 1 may be selected as candidate curve segments, and from all the candidate curve segments, one or more curve segments with the highest correlation coefficient may be selected as target curve segments of the first charging characteristic curve.

In an embodiment, in the first determination module 120, when the characteristic parameters include a charging duration, a charging duration corresponding to a maximum charging voltage of a single battery in the battery under test in the target curve segment is obtained from the second charging data, a battery state of health matching the charging duration is calculated by combining a corresponding relation between characteristic parameters of the target curve segment and a battery state of health, and the calculated battery state of health is represents the battery state of health of the battery under test in current charging conditions.

A specific implementation of determining the corresponding relation is described below, and as shown in FIG. 5, the corresponding relation in the first determination module 120 is established by the following units:

an acquisition unit 121, configured to charge the test battery for M times to obtain the second charging data corresponding to each time; the second charging data including a second charging characteristic curve and a battery state of health; M≥1 and M being an integer.

It should be noted that the test battery may be a plurality of batteries of the same type.

The second dividing unit 122 is configured to, for each second charging characteristic curve, divide the second charging characteristic curve into a plurality of second curve segments according to a same division rule, calculate a correlation coefficient between the charging duration and the battery state of health of each second curve segment, and select at least one second curve segment with the highest correlation coefficient as a target curve segment of the second charging characteristic curve.

The fitting unit 123 is configured to fit the target curve segments corresponding to the M second charging characteristic curves and the M battery states of health and determine the fitting result as the corresponding relation.

During the process of charging the test battery for M times, obtaining M second charging characteristic curves, each time of charging corresponds to one SOH value, resulting in M SOH values. Considering an example in which the test batteries all decayed from 100% SOH value to 75% SOH value, the SOH value can be calculated using the formula:

SOH=$C\_now/C\_rated$ wherein C_now represents the actual charging capacity of the test battery currently charged, and is obtained by the BMS; C_rated represents the factory rated capacity of the test battery.

The second charging characteristic curve is divided into a plurality of second curve segments, from which the target curve segment is selected. Specifically, the correlation coefficient P corresponding to each second curve segment is calculated. The specific calculation formula of P is as follows:

$$P = \frac{\sum_i (\Delta T_i - \overline{\Delta T})(S_i - \overline{S})}{\sqrt{\sum_i (\Delta T_i - \overline{\Delta T})^2} \sqrt{\sum_i (S_i - \overline{S})^2}}$$

wherein 1≤i≤M, $\Delta T_i$ is the charging duration of the ith charging time corresponding to each second curve segment, $\overline{\Delta T}$ is the average charging duration of M charging times corresponding to each second curve segment, $S_i$ is the SOH value for the ith charging time corresponding to each second curve segment, and $\overline{S}$ is the average SOH value of M charging times corresponding to each second curve segment. The second curve segment that corresponds to the highest correlation coefficient P is selected as the target curve segment for the second charging characteristic curve.

Each second curve segment corresponds to M SOH values. A correlation coefficient P corresponding to each second curve segment can be calculated using M charging durations and M SOH values.

Higher-order or exponential equations can be used to fit M target curve segments and M battery states of health, wherein a specific calculation formula is as follows:

$SOH_i = \alpha \Delta T_i^2 + \Delta \beta T_i + \gamma$ wherein $\Delta T_i$ is the charging duration of the ith charging time corresponding to the target curve segment, $SOH_i$ is the SOH value for the ith charging time corresponding to the target curve segment, and α、β、γ are fitting parameters.

In this embodiment, by establishing a corresponding relation between the characteristic parameters of the target curve segment of the tested battery and the battery state of health, using characteristic parameters of the target curve segment matching battery states of health to determine the battery state of health of the battery under test, the reliability and accuracy of battery state of health detection are improved.

Embodiment 4

Figure 6:
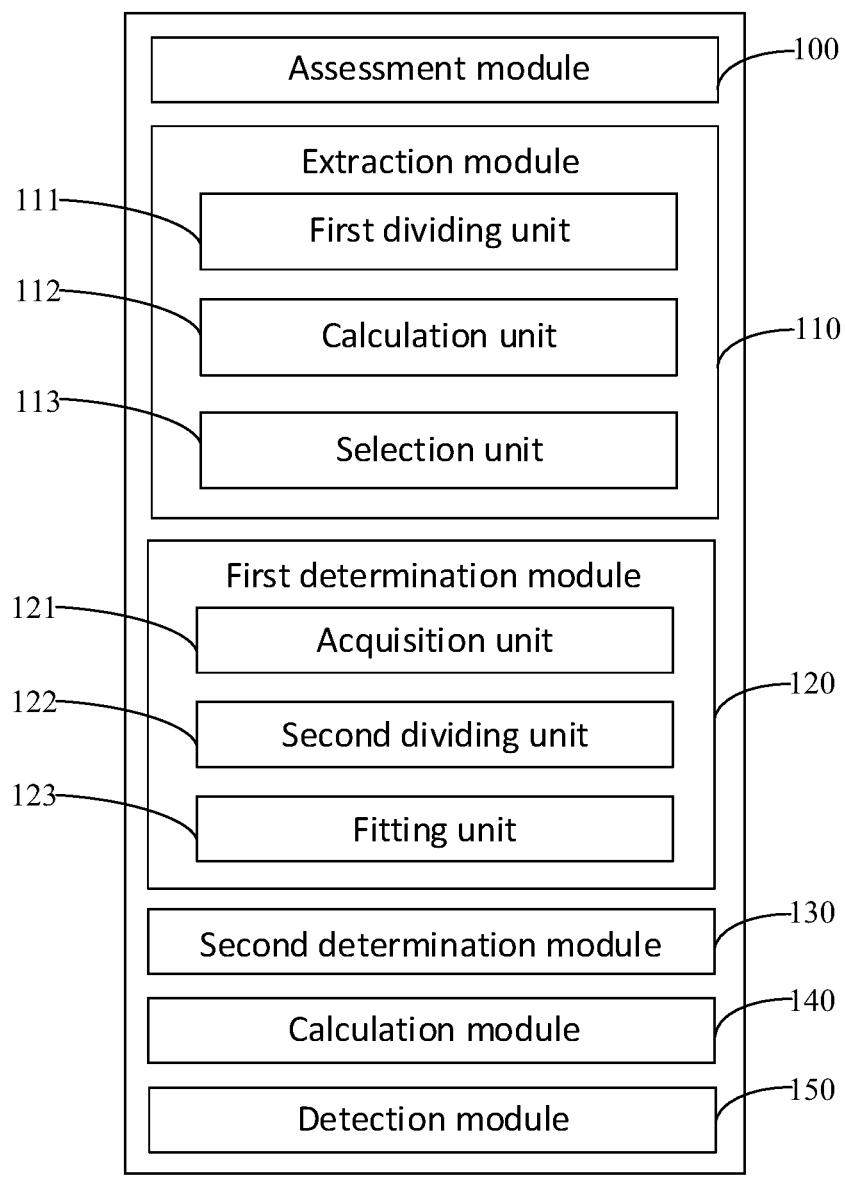
FIG. 6 is a block diagram of a system for detecting a battery state of health according to Embodiment 4 of the present invention.

On the basis of Embodiment 3, the present embodiment provides a system for detecting a battery state of health, as shown in FIG. 6. In comparison with Embodiment 3, the system includes:

An assessment module 100, configured to assess whether the number of charging times of the battery under test in abusive operating conditions meets a frequency threshold.

If an assessment result of the assessment module 100 is yes, the extraction module 110 is invoked; if the assessment result of the assessment module 100 is no, a second determination module 130 is invoked.

The charging data may include, but is not limited to, ambient temperature, charging rate, charging voltage, charging current, and the like. The BMS can be used to detect the ambient temperature in which the battery under test is charged, such as high temperature or low temperature; parameters that characterize life cycle features of the battery under test, such as charging rate, and parameters that characterize the state of charge of the battery under test, such as the charging voltage and the charging current, can also be used. Based on charging data obtained from the BMS, it can be determined whether the battery under test is experiencing any one of the abusive operating conditions of high temperature, low temperature, high charging rate, overcharging or over-discharging during each charging time, and the extraction module 110 is automatically invoked when it is detected that the number of charging times in the abusive operating conditions meet a frequency threshold. The frequency threshold is determined according to actual requirements, and is set to 4 times, for example. If the number of charging times under abusive operating conditions is detected not to exceed the frequency threshold, the second determination module 130 is automatically invoked.

A second determination module 130, configured to determine a capacity and a direct current internal resistance of the battery under test during a current charging time and at least one past charging time.

If the capacity and the direct current internal resistance of the battery under test during multiple past charging times are adopted to calculate the relative change rate of internal resistance capacity, the relative change rate of internal resistance capacity is calculated according to the capacity average value and the direct current internal resistance average value of the battery under test during each past charging time. Alternatively, the relative change rate of internal resistance capacity is calculated according to the weighted result of the capacity and the weighted result of the direct current internal resistance of the battery under test during each past charging time.

A calculation module 140, configured to calculate a relative change rate of current internal resistance capacity of the battery under test according to the capacity and the direct current internal resistance.

Experiments show that the relative change rate of internal resistance capacity can effectively diagnose abnormal battery aging and provide early warnings for battery misuse. A detection module 150, configured to detect abusive operating conditions of the battery under test according to the relative change rate of current internal resistance capacity and the corresponding relation between the relative changes rates of internal resistance capacity and abnormal types.

If the current charging capacity of the battery under test is Cn_charge, the SOC (State of Charge) value of the battery under test before charging is $SOC_1$, the SOC value of the battery under test after charging is $SOC_2$, and the capacity Cn can be calculated based on $SOC_1$ and $SOC_2$ using the following formula:

$$Cn=(Cn\_charge)/(SOC_2-SOC_1)$$

When the battery under test reached 90% SOC, it was left to rest for 5 minutes, and after charging the battery under test for 10 seconds applying a pulse current of 75% $I_{max}$, it was left to rest for 5 minutes. The corresponding pulse voltage rise ΔU on the battery under test was measured. The direct current internal resistance $R_n$ can be calculated based on the pulse voltage rise ΔU using the following formula:

$$R_n = \frac{\Delta U}{0.75 * I_{max}}$$

In the second determination module 130, a first capacity Cn1 of the battery under test during current charging and a second capacity Cn2 of the battery under test during any at least one past charging are obtained, and a first difference |Cn1−Cn2| between the first capacity and the second capacity can be calculated according to a weighted result or an average result of capacities of the battery to be measured during multiple past charging. The method comprises the steps of obtaining a first direct current internal resistance Rn1 during current charging and a second direct current internal resistance Rn2 during any at least one past charging, determining the first direct current internal resistance Rn2 according to a weighted result or an average result of the direct current internal resistances of the batteries under test which are subjected to multiple past charging, and calculating a second difference value |Rn1−Rn2| between the first direct current internal resistance and the second direct current internal resistance.

In the calculation module 140, the relative change rate of current internal resistance capacity $K_{mn}$ is calculated based on the first difference value and the second difference value. The specific calculation formula for $K_{mn}$ is as follows:

$$K_{mn} = \frac{|Rn1 - Rn2|}{|Cn1 - Cn2|}$$

In the detection module 150, multiple sets of comparison tests may be performed on the batteries under test of the same type and the same rated capacity in advance, including single variable tests such as a normal aging condition test, an overcharge aging condition test, a high-temperature aging condition test, a low-temperature aging condition test, and the like. During the tests, charging can be performed under a constant-current condition, and discharging can be carried out under any accelerated aging condition. The objective is to determine a normal range and an abnormal range of relative change rates of internal resistance capacity under tests of different aging conditions, so as to provide a basis for subsequent abusive condition detection on the batteries under test.

Once the abnormal type of the battery under test is determined, the relative change rate of current internal resistance capacity is assessed to determine whether it falls within the abnormal range. If yes, this indicates the current charging of the battery under test is under abusive operating conditions, resulting in permanent damage to the battery and automatically triggering an alarm prompt.

In present embodiment, the number of times the battery under test is charged under abusive operating conditions is compared with the frequency threshold, and if the condition is met, the battery state of health that matches the characteristic parameters of the target curve segment is determined to be the battery state of health of the battery under test; if not met, the relative change rate of current internal resistance capacity of the battery under test is calculated using capacity and direct current internal resistance, enabling detection of abusive operating conditions for the battery under test. This invention improves the reliability and accuracy of battery state of health detection by combining normal decay SOH value calculations with abnormal decay warnings.

Embodiment 5

Figure 7:
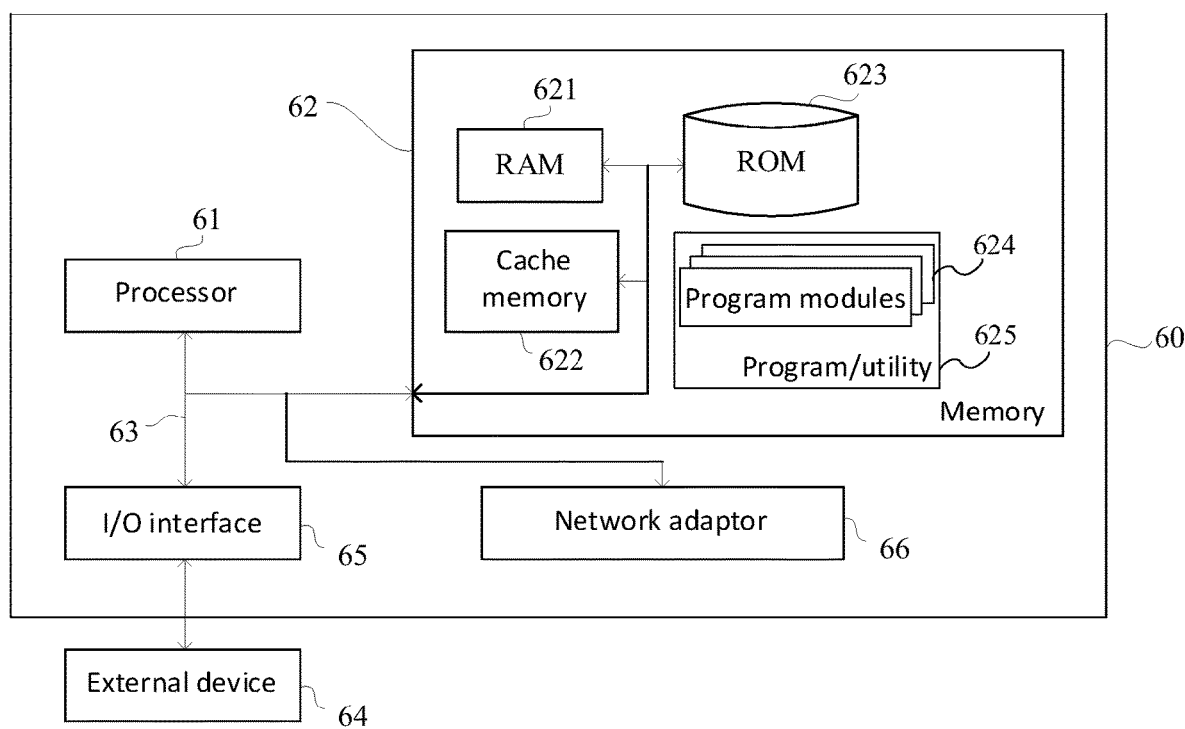
FIG. 7 is a schematic diagram of a hardware structure of an electronic device according to Embodiment 5 of the present invention.

FIG. 7 is a schematic structural diagram of an electronic device provided in this embodiment. The smart helmet comprises a memory, a processor and a computer program stored on the memory and executable on the processor, and the processor executes the program to implement the method for detecting a battery state of health of Embodiment 1 or Embodiment 2. The electronic device 60 shown in FIG. 7 is merely an example and should not impose any limitations on the functionality and scope of use the embodiments of the present invention.

The electronic device 60 may take the form of a general purpose computing device, such as a server device. The components of the electronic device 60 may include, but are not limited to: the at least one processor 61, the at least one memory 62, and a bus 63 connecting the various system components (including the memory 62 and the processor 61).

The bus 63 includes a data bus, an address bus, and a control bus.

The memory 62 may include volatile memory, such as Random Access Memory (RAM) 621 and/or cache memory 622, and may further include Read Only Memory (ROM) 623.

The memory 62 may also include a program/utility 625 having a set (at least one) of program modules 624, such program modules 624 including, but not limited to: an operating system, one or more application programs, other program modules, and program data, each of which, or some combination thereof, may include an implementation of a network environment.

The processor 61 executes various functional applications and data processing, such as the method for detecting battery state of health of Embodiment 1 or Embodiment 2 of the present invention, by running the computer program stored in the memory 62.

The electronic device 60 may also communicate with one or more external devices 64 (e.g., a keyboard, a pointing device, etc.). Such communication may be through an input/output (I/O) interface 65. Also, the model-generated electronic device 60 may also communicate with one or more networks (e.g., a Local Area Network (LAN), a Wide Area Network (WAN), and/or a public network, such as the Internet) via a network adapter 66. As shown, network adapter 66 communicates with the other modules of model-generated electronic device 60 via bus 63. It should be understood that, although not shown in the figures, other hardware and/or software modules may be used in conjunction with the model-generated electronic device 60, including but not limited to: microcode, device drivers, redundant processors, external disk drive arrays, RAID (Redundant Array of Independent Disks) systems, tape drives, and data backup storage systems, to name a few.

It is important to note that although in the above detailed description several units/modules or sub-units/modules of the electronic device are mentioned, such a division is merely exemplary and not mandatory. Indeed, the features and functionality of two or more of the units/modules described above may be embodied in one unit/module according to implementations of the invention. Conversely, the features and functions of one unit/module described above may be further divided and implemented by a plurality of units/modules.

Embodiment 6

The present embodiment provides a computer-readable storage medium on which a computer program is stored, the program implementing the method for detecting a battery state of health of Embodiment 1 or Embodiment 2 when executed by a processor.

The computer-readable storage medium may encompass more specific options including, but are not limited to: a portable disk, a hard disk, random access memory, read only memory, erasable programmable read only memory, optical storage device, magnetic storage device, or any suitable combination of the foregoing.

In a possible implementation, the present invention may also be implemented in the form of a program product comprising program code for causing a terminal device to carry out the method for detecting a battery state of health of Embodiment 1 or Embodiment 2, when the program product is run on said terminal device.

Program code for carrying out the invention may be written in any combination of one or more programming languages, and the program code may be executed entirely on the user device, partly on the user device, as a stand-alone software package, partly on the user device and partly on a remote device or entirely on the remote device.

The foregoing description of the exemplary embodiments of the invention has been presented only for the purposes of illustration and description and is not intended to be exhaustive or to limit the invention to the precise forms disclosed. Many modifications and variations are possible in light of the above teaching. The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the invention pertains without departing from its spirit and scope. Accordingly, the scope of the invention is defined by the appended claims rather than the foregoing description and the exemplary embodiments described therein.

What is claimed is:

1. A method for detecting a battery state of health, comprising:

extracting a target curve segment from a first charging characteristic curve of a battery under test; the first charging characteristic curve being determined according to first charging data obtained by charging the battery under test according to target charging parameters, and the target curve segment being at least one curve segment with highest correlation to the battery state of health; and determining, according to a corresponding relation between characteristic parameters of the target curve segment and the battery state of health, the battery state of health matching the characteristic parameters of the target curve segment, and determining the battery state of health as the battery state of health of the battery under test; wherein the corresponding relation is determined according to second charging data obtained by charging a test battery of the same type as the battery under test using the target charging parameters, wherein the characteristic parameters include a charging duration, wherein the step of extracting the target curve segment from the first charging characteristic curve of the battery under test comprises:

dividing the first charging characteristic curve into a plurality of first curve segments;

calculating a correlation coefficient of the charging duration and the battery state of health of each first curve segment; and selecting at least one of the first curve segments with a highest correlation coefficient as the target curve segment of the first charging characteristic curve.

2. The method of claim 1, wherein the corresponding relation is established by:

charging the test battery for M times to obtain the second charging data corresponding to each time; the second charging data including a second charging characteristic curve and a battery state of health; $M \geq 1$ and M being an integer;

for each second charging characteristic curve, dividing the second charging characteristic curve into a plurality of second curve segments according to a same division rule, calculating a correlation coefficient between the charging duration and the battery state of health of each second curve segment, and selecting at least one second curve segment with a highest correlation coefficient as a target curve segment of the second charging characteristic curve; and fitting the target curve segments corresponding to the M second charging characteristic curves and the M battery states of health, and determining the fitting result as the corresponding relation.

3. The method of claim 1, wherein before the step of extracting the target curve segment from the first charging characteristic curve of the battery under test, the method further comprises:

assessing whether a number of charging times of the battery under test in abusive operating conditions meets a frequency threshold;

if an assessment result is yes, executing the step of extracting the target curve segment from the first charging characteristic curve of the battery under test.

4. The method of claim 3, further comprising:

if the assessment result is no, determining a capacity and a direct current internal resistance of the battery under test during a current charging time and at least one past charging time;

calculating a relative change rate of current internal resistance capacity of the battery under test according to the capacity and the direct current internal resistance; and detecting the abusive operating conditions of the battery under test according to the relative change rate of current internal resistance capacity and the corresponding relation between relative change rates of internal resistance capacity and abnormal types.

5. An electronic device comprising a processor, a memory, and a computer program stored on the memory and executable on the processor, wherein the processor implements the method for detecting a battery state of health according to claim 1 when executing the computer program.

6. A system for detecting a battery state of health, comprising:

an extraction module, configured to extract a target curve segment from a first charging characteristic curve of a battery under test; the first charging characteristic curve being determined according to first charging data obtained by charging the battery under test according to target charging parameters, and the target curve segment being at least one curve segment with highest correlation to the battery state of health; and a first determination module, configured to determine, according to a corresponding relation between characteristic parameters of the target curve segment and the battery state of health, the battery state of health matching the characteristic parameters of the target curve segment, and determining the battery state of health as the battery state of health of the battery under test; wherein the corresponding relation is determined according to second charging data obtained by charging a test battery of the same type as the battery under test using the target charging parameters, wherein the characteristic parameters include a charging duration, wherein the extraction module comprises:

a first dividing unit, configured to divide the first charging characteristic curve into a plurality of first curve segments;

a calculation unit, configured to calculate a correlation coefficient of the charging duration and the battery state of health of each first curve segment; and a selection unit, configured to select at least one of the first curve segments with a highest correlation coefficient as the target curve segment of the first charging characteristic curve.

7. The system of claim 6, wherein the corresponding relation comprises is established by:

an acquisition unit, configured to charge the test battery for M times to obtain the second charging data corresponding to each time; the second charging data including a second charging characteristic curve and a battery state of health; M≥1 and M being an integer;

a second dividing unit, configured to divide each second charging characteristic curve into a plurality of second curve segments according to a same division rule, calculate a correlation coefficient between the charging duration and the battery state of health of each second curve segment, and select at least one second curve segment with a highest correlation coefficient as a target curve segment of the second charging characteristic curve; and a fitting unit, configured to fit the target curve segments corresponding to the M second charging characteristic curves and the M battery states of health and determine the fitting result as the corresponding relation.

8. The system of claim 6, further comprising:

an assessment module, configured to assess whether a number of charging times of the battery under test in abusive operating conditions meets a frequency threshold; if the assessment result is yes, invoke the extraction module, and if the assessment result is no, invoke a second determination module.

9. The system of claim 8, further comprising:

the second determination module, configured to determine a capacity and a direct current internal resistance of the battery under test during a current charging time and at least one past charging time;

a calculation module, configured to calculate a relative change rate of current internal resistance capacity of the battery under test according to the capacity and the direct current internal resistance; and a detection module, configured to detect abusive operating conditions of the battery under test according to the relative change rate of current internal resistance capacity and the corresponding relation between relative change rates of internal resistance capacity and abnormal types.

* * * * *